(12) United States Patent
Tsai

(10) Patent No.: US 7,130,248 B1
(45) Date of Patent: Oct. 31, 2006

(54) REAL TIME CLOCK CHARGING CIRCUIT

(75) Inventor: Ticky Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/184,770

(22) Filed: Jul. 20, 2005

(51) Int. Cl.
*G04B 1/00* (2006.01)
*H02J 7/00* (2006.01)
*G05F 1/40* (2006.01)

(52) U.S. Cl. .................. 368/204; 320/134; 323/282; 713/340

(58) Field of Classification Search ........ 368/203–204; 307/18, 64–66; 320/116, 134; 329/137, 329/166; 323/265, 282; 702/60, 63, 64; 713/300, 340
See application file for complete search history.

(56) References Cited

U.S. PATENT DOCUMENTS 3,861,134 A * 1/1975 Chacon et al. ............... 368/48
5,834,857 A * 11/1998 Abe et al. ..................... 307/66
5,905,365 A * 5/1999 Yeh ............................ 320/166
6,177,780 B1 * 1/2001 Roy et al. .................... 320/128
6,459,235 B1 * 10/2002 Odeohhara et al. ......... 320/116
6,603,365 B1 * 8/2003 Dotzler et al. ................ 331/74
2003/0085621 A1 * 5/2003 Potega ......................... 307/18
2005/0001594 A1 * 1/2005 Felder ......................... 320/134
2005/0253559 A1 * 11/2005 Felder ......................... 320/136
2006/0082351 A1 * 4/2006 Martins et al. .............. 323/268

* cited by examiner

*Primary Examiner*—Vit W. Miska
(74) *Attorney, Agent, or Firm*—Bacon & Thomas

(57) ABSTRACT

The present invention is to provide a real time clock charging circuit mounted on a circuit board, which comprising an booting power input terminal adapted to receive a booting power passed through a first control module to a power storage unit and a second control module; the power storage unit adapted to store the booting power and to output a spare power prohibited from flowing into the first control module and the spare power only flows into the second control module as receiving no input power; a standby power input terminal adapted to receive a standby power to the second control module enabling to output those power to the real time clock and avoiding them to transmit outside.

8 Claims, 2 Drawing Sheets

REAL TIME CLOCK CHARGING CIRCUIT

FIELD OF THE INVENTION

The present invention relates to a real time clock charging circuit, and more particularly to a real time clock charging circuit that only installs several control modules to control power flowing directions for charging a real time clock.

BACKGROUND OF THE INVENTION

In the cyber era, the information transmission speed and communication mode which has been greatly improved subject to the development of sophisticated wireless communication devices, electronic device and network transmission technology. Nowadays, a variety of portable electronic apparatus are intensively used in our daily life as important means for wireless communication and network services. An electronic apparatus generally has a RTC (real time clock) installed in the circuit board thereof for recording system time. A real time clock is one of the requisite hardware devices of an electronic apparatus. The real time clock of an electronic apparatus uses a battery to provide the necessary working voltage for normal functioning when input power is off, eliminating the problem of resetting the time frequently.

FIG. 1 shows a real time clock charging circuit according to the prior art. According to this design, the real time clock charging circuit 1 is mounted on a circuit board, comprising a booting power input terminal 11, a standby power input terminal 12, a charging battery 13, a resistor 14, and a chip 15. The booting power input terminal 11 is adapted to receive a booting power. The standby power input terminal 12 is adapted to receive a standby power. The charging battery 13 is adapted to store electricity and to output it. The resistor 14 has one end electrically connected to the chip 15 and the other end electrically connected to the charging battery 13. The chip 15 is electrically connected to the real time clock. The chip 15 controls the flowing direction of the booting power, the standby power and the charging power.

Referring to FIG. 1 again, the chip 15 has a first input pin 151, a second input pin 152, a third input pin 153, and a power output pin 154. The first input pin 151 is electrically connected to the booting power input terminal 11. The second input pin 152 is electrically connected to the standby power input terminal 12. The third input pin 153 is electrically connected to one end of the resistor 14. The power output pin 154 is electrically connected to the real time clock to provide the real time clock with the necessary working power. During input of the booting power, the first input pin 151 receives the booting power. During input of the standby power, the second input pin 152 receives the standby power. The booting power and the standby power can be outputted to the real time clock through the power output pin 154, and transmitted through the third input pin 153 and the resistor 14 to the charging battery 13 for storage. When the booting power and the standby power are off, the charging battery 13 outputs the charging power through the third input pin 153 and the power output pin 154 to the real time clock. Thus, the necessary working power is constantly provided to the real time clock, keeping the real time clock to work continuously.

According to the aforesaid prior art real time clock charging circuit 1, the chip 15 is an important component that controls the flowing direction of power inputted from different power sources into the real time clock charging circuit 1. However, the complicated structure of the power input pins 151,152,153 and power output pin 154 of the chip 15 greatly increases the cost to install the chip 15 in the circuit board. Under the market trend to increase the density of component parts and chip sets in a circuit board, it is difficult to arrange the chip 15 in the limited space of the circuit board. The high cost of the chip 15 greatly complicates the design of the real time clock charging circuit and increases its manufacturing cost. Therefore, it is desirable to provide an inexpensive real time clock charging circuit that can easily be arranged on a circuit board.

SUMMARY OF THE INVENTION

The present invention has been accomplished under the circumstances in view. It is therefore the main object of the present invention to provide a real time clock charging circuit, which simplifies the circuit layout on a circuit board. It is another object of the present invention to provide a real time clock charging circuit, which is easy and inexpensive to manufacture.

To achieve these and other objects of the present invention, the real time clock charging circuit is mounted on a circuit board and adapted to charge a real time clock being electrically connected thereto. The real time clock charging circuit comprises a booting power input terminal adapted to receive a booting power; a power storage unit adapted to receive and store the booting power from the booting power input terminal and to output a spare power when the real time clock charging circuit receives no input power from the outside; a first control module electrically connected between the booting power input terminal and the power storage unit and adapted to prohibit the spare power and the booting power from flowing to the booting power input terminal; a standby power input terminal adapted to receive a standby power from an external standby power source when the booting power input terminal receives no input power; and a second control module electrically connected to the first control module, the power storage unit and the standby power input terminal, to prohibit the booting power and the spare power from flowing into the booting power input terminal and prohibit the standby power from flowing into the first control module and the power storage unit, so as to receive the booting power, the spare power and the standby power respectively, and to output the booting power, the standby power and the spare power to the real time clock.

The above and other objects, features and advantages of the present invention will become apparent from the following detailed description taken with the accompanying drawings.

DETAILED DESCRIPTION OF THE PREFERRED EMBODIMENTS

Figure 1:
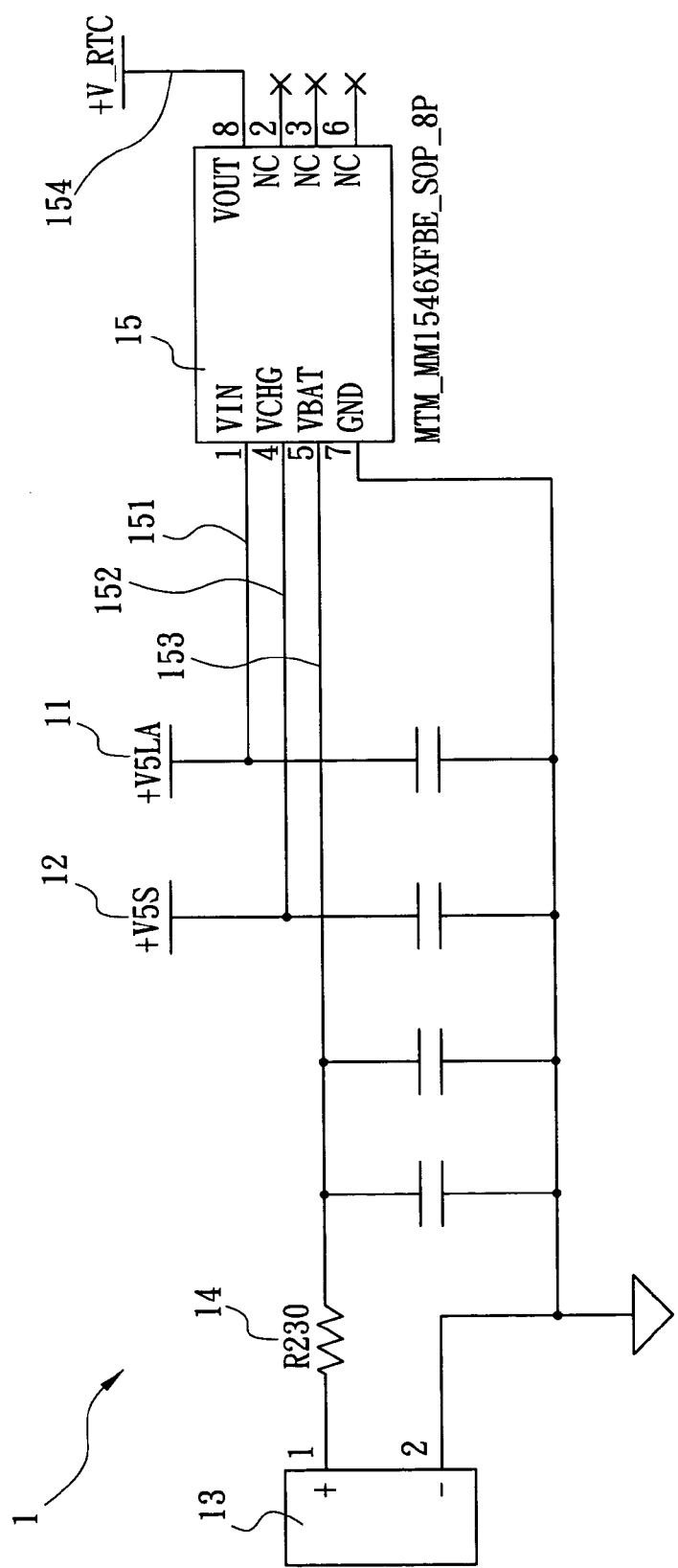
FIG. 1 is a circuit diagram of a real time clock charging circuit according to the prior art.
Figure 2:
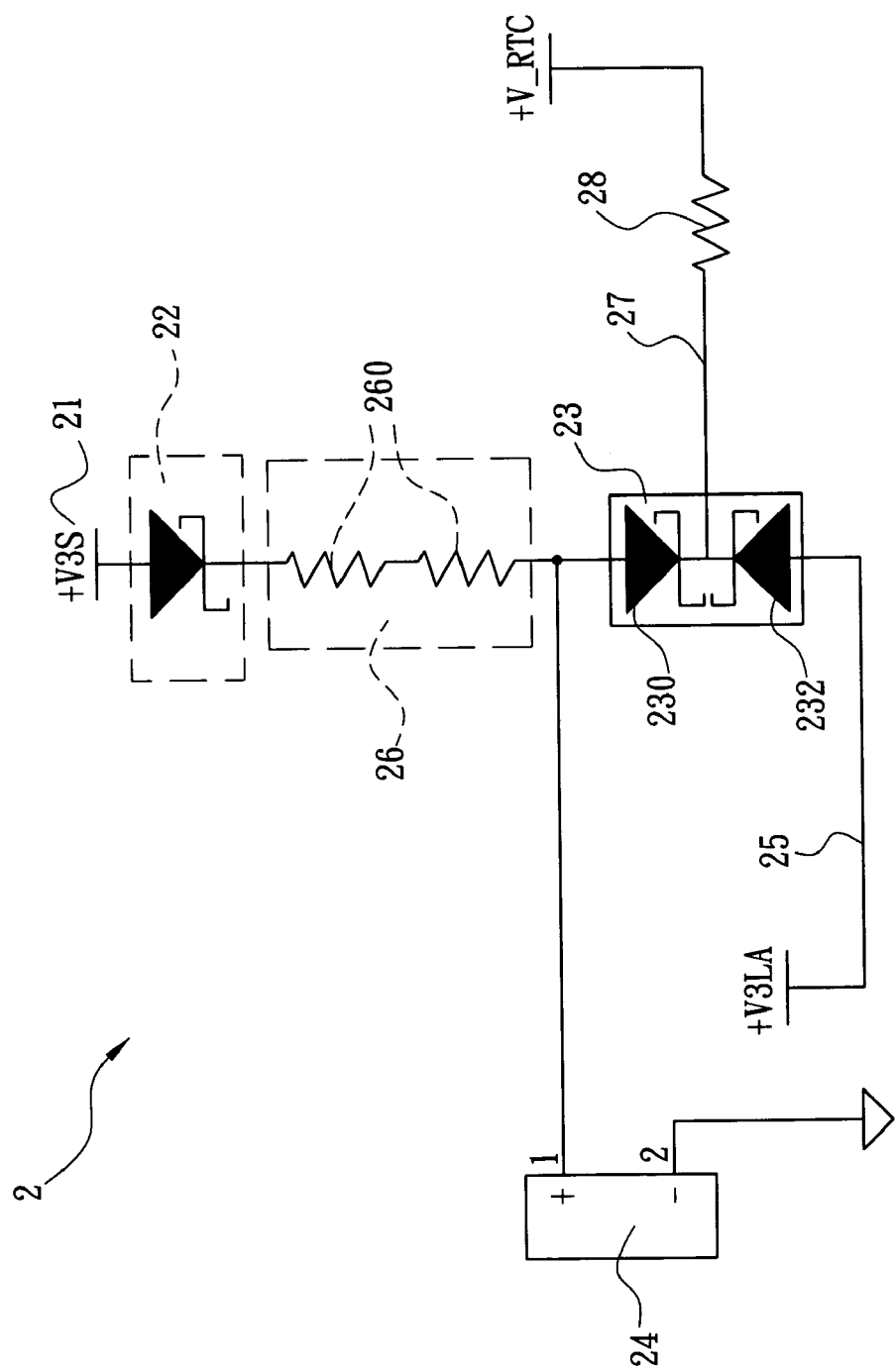
FIG. 2 is a circuit diagram of a real time clock charging circuit according to the present invention.

Referring to FIG. 2, a real time clock charging circuit 2 in accordance with the present invention is mounted on a circuit board, comprising a booting power input terminal 21, a first control module 22 electrically connected to the booting power input terminal 21, a second control module 23 and a power storage unit 24 electrically connected to the first control module 22, a standby power input terminal 25 electrically connected to the second control module 23, a power output terminal 27 electrically connected between the second control module 23 and a real time clock. The booting power input terminal 21 receives an input power to start the system. The standby power input terminal 25 is adapted to receive a standby power from an external standby power source. The power storage unit 24 is adapted to receive and store the booting power inputted through the booting power input terminal 21, or to output a spare power. The first control module 22 prohibits the spare power from flowing into the booting power input terminal 21. The second control module 23 prohibits the booting power and the spare power from flowing into the standby power input terminal 25, and the standby power from flowing into the first control module 22 and the power storage unit 24, thus, the second control module 23 receives the booting power, the spare power and the standby power respectively, and outputs the booting power, the standby power and the spare power respectively to the real time clock.

During inputting of the booting power, the booting power is charged to the power storage unit 24 and at the same time, outputted to the real time clock via the second control module 23. When the booting power is off, the standby power is outputted to the real time clock subject to the control of the second control module 23. When the booting power and the standby power are off, the spare power is outputted to the real time clock subject to the control of the second control module 23. This design achieves the control of the flowing direction of the booting power, standby power and spare power without the use of an expensive control chip in the real time clock charging circuit 2. Therefore, the invention greatly saves the manufacturing cost and the circuit board mounting space. The real time clock charging circuit 2 can be used in any of a variety of electronic apparatus to effectively reduce the manufacturing cost of the electronic apparatus.

Referring to FIG. 2 again, the real time clock charging circuit 2 further comprises a voltage step-down module 26 which has an input end electrically connected to the first control module 22 and an output end electrically connected to the power storage unit 24 and the second control module 23 respectively. The voltage step-down module 26 is adapted to drop the voltage of the booting power inputted through the booting power input terminal 21 into the predetermined level and to fit the power storage unit 24 and the real time clock.

Referring to FIG. 2 again, the voltage step-down module 26 comprises two first resistors 260 connected in series. This design prevents short-circuit of the real time clock charging circuit 2 and simplifies the layout of the real time clock charging circuit 2.

Referring to FIG. 2 again, the power output terminal 27 has one end electrically connected to the second control module 23 and the other end electrically connected to the real time clock for transmitting the booting power, standby power or spare power to the real time clock.

Referring to FIG. 2 again, the first control module 22 can be a diode for transmitting the booting power from the booting power input terminal 21 to the power storage unit 24 and the second control module 23, and prohibiting the spare power from flowing to the booting power input terminal 21. Alternatively, the first control module 22 can be a LED (light-emitting diode), which transmits the booting power from the booting power input terminal 21 to the power storage unit 24 and the second control module 23, prohibits the spare power from flowing to the booting power input terminal 21, and emits a light to give a visual signal which indicates the operation status of the apparatus upon transmission of the booting power from the booting power input terminal 21 through the first control module 22.

Referring to FIG. 2 again, the second control module 23 is comprised of a first diode 230 and a second diode 232. The first diode 230 has an input end electrically connected to the power storage unit 24 and the output end of the voltage step-down module 26 respectively. The second diode 232 has an input end electrically connected to the standby power input terminal 25. The output ends of the first diode 230 and the second diode 232 respectively connected to the power output terminal 27. During input of the booting power or spare power, the booting power or spare power passes through the first diode 230 to the power output terminal 27, and is prohibited by the second diode 232 from flowing to the standby power input terminal 25. During input of the standby power, the standby power passes through the second diode 232 to the power output terminal 27, and is prohibited by the first diode 230 from flowing to the power storage unit 24 and the voltage step-down module 26. Thus, by means of a limited number of diodes, the invention achieves the control of the flowing direction of each current.

Referring to FIG. 2 again, a second resistor 28 is installed in the power output terminal 27 to stabilize the supply of the booting power, standby power or spare power to the real time clock.

As indicated above, the invention provides a real time clock charging circuit, which has the following advantages:

1. The invention uses diodes instead of the use of a chip, thereby simplifying the manufacturing and lowering the cost of the real time clock charging circuit.

2. The invention uses diodes and resistors to complete the layout of the real time clock charging circuit, thereby saving much circuit board installation space and manufacturing cost of the circuit.

3. When the booting power is off, the standby power input terminal 25 provides the necessary working voltage to the real time clock, and the spare power is used for the real time clock only when input power fails, keeping constant working of the real time clock.

4. The two first resistors 260 of the voltage step-down module 26 are connected in series on the circuit board to simply the layout of the real time clock charging circuit 2 and to prevent short-circuit of the real time clock charging circuit 2, meeting the safety codes.

A prototype of real time clock charging circuit has been constructed with the features of FIG. 2. The real time clock charging circuit functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A real time clock charging circuit mounted on a circuit board and adapted to charge a real time clock being electrically connected thereto, comprising:
   a booting power input terminal adapted to receive an booting power;
   a power storage unit adapted to receive and store said booting power from said booting power input terminal and to output a spare power when the real time clock charging circuit receives no input power from the outside;

a first control module electrically connected between said booting power input terminal and said power storage unit and adapted to prohibit said spare power from flowing into said booting power input terminal;

a standby power input terminal adapted to receive a standby power from an external standby power source when said booting power input terminal receives no input power; and a second control module electrically connected to said first control module, said power storage unit and said standby power input terminal to prohibit said booting power and said spare power from flowing into said booting power input terminal and to prohibit said standby power from flowing into said first control module and said power storage unit, and to receive said booting power, said spare power and said standby power respectively, and to output said booting power, said standby power and said spare power to said real time clock.

2. The real time clock charging circuit as claimed in claim 1, further comprising a voltage step-down module adapted to drop the voltage of said booting power to a predetermined level, said voltage step-down module having an input end electrically connected to said first control module and an output end electrically connected to said power storage unit and said second control module.

3. The real time clock charging circuit as claimed in claim 2, wherein said voltage step-down module is comprised of a plurality of first resistors connected in series.

4. The real time clock charging circuit as claimed in claim 1, further comprising a power output terminal electrically connected between said second control module and said real time clock.

5. The real time clock charging circuit as claimed in claim 1, wherein said first control module is comprised of a diode, which transmits said booting power from said booting power input terminal to said power storage unit and said second control module, and prohibits said spare power from flowing to said booting power input terminal.

6. The real time clock charging circuit as claimed in claim 1, wherein said first control module is comprised of a light emitting diode, which transmits said booting power from said booting power input terminal to said power storage unit and said second control module, prohibits said spare power from flowing to said booting power input terminal, and emits a light upon flowing of said booting power from said booting power input terminal through said first control module.

7. The real time clock charging circuit as claimed in claim 4, wherein said second control module comprises:

a first diode said having an input end electrically connected to said power storage unit and an output end of said voltage step-down module, and an output end electrically connected to said power output terminal, said first diode for letting said booting power and said spare power pass and prohibiting said standby power from flowing to said power storage unit and said voltage step-down module, and a second diode having an input end electrically connected to said standby power input end and an output end electrically connected to said power output terminal, said second diode for letting said standby power pass and prohibiting said booting power and said spare power from flowing to said standby power input terminal.

8. The real time clock charging circuit as claimed in claim 4, wherein said power output terminal has a second resistor installed therein.

\* \* \* \* \*